United States Patent
Rollins et al.

(10) Patent No.: US 12,166,404 B2
(45) Date of Patent: Dec. 10, 2024

(54) SEALED, SELF-COOLING-MOTOR WITH CONDUCTIVE HEAT TRANSFER THERMAL MANAGEMENT CAPABILITY

(71) Applicant: PRIME DATUM DEVELOPMENT COMPANY LLC, Canandaigua, NY (US)

(72) Inventors: Patrick M. Rollins, Canandaigua, NY (US); George Lucas, Canandaigua, NY (US)

(73) Assignee: Prime Datum Development Company, LLC, Canandaigua, NY (US)

( * ) Notice: Subject to any disclaimer, the term of this patent is extended or adjusted under 35 U.S.C. 154(b) by 0 days.

(21) Appl. No.: 17/703,326

(22) Filed: Mar. 24, 2022

(65) Prior Publication Data

US 2022/0216769 A1 Jul. 7, 2022

Related U.S. Application Data

(63) Continuation of application No. 16/885,075, filed on May 27, 2020, now abandoned, which is a (Continued)

(51) Int. Cl.
*H02K 1/00* (2006.01)
*F28C 1/00* (2006.01)
(Continued)

(52) U.S. Cl.
CPC ............... *H02K 9/06* (2013.01); *F28C 1/00* (2013.01); *F28F 25/06* (2013.01); *F28F 25/10* (2013.01);
(Continued)

(58) Field of Classification Search
CPC .. H02K 5/15; H02K 5/18; H02K 9/08; H02K 9/22; H02K 9/223; H02K 9/227;
(Continued)

(56) References Cited

U.S. PATENT DOCUMENTS

| 4,153,034 A | * | 5/1979 | Sato | H02K 5/10 |
| | | | | 123/195 C |
| 6,211,587 B1 | * | 4/2001 | Enomoto | H02K 5/15 |
| | | | | 310/410 |

(Continued)

FOREIGN PATENT DOCUMENTS

| EP | 1100182 A1 | * | 5/2001 | ............... H02K 5/18 |
| JP | 2010057211 A | * | 3/2010 | |
| WO | WO-2013059764 A1 | * | 4/2013 | ............ B01F 23/214 |

OTHER PUBLICATIONS

Timtronics, Data Sheet Printout, Dec. 2013 (Year: 2013).*

(Continued)

*Primary Examiner* — Eric Johnson
(74) *Attorney, Agent, or Firm* — Richard T. Black; FisherBroyles, LLP; Thomas J. Osborne, Jr.

(57) ABSTRACT

An electric machine has a housing which has an interior space and an interior wall extending about the interior space, and a stator assembly disposed within the interior space and attached to the interior wall. The electric machine includes a rotor within the interior space and located radially inward from the stator. The rotor and stator define a gap there between and cooperate to produce flux. The rotor comprises a hollow cylindrical member having an interior region, an interior wall extending about the interior region and an exterior surface. The rotor includes magnets attached to the exterior surface and a rotor shaft support structure disposed within the interior region of the hollow cylindrical member and attached to the interior wall of the hollow cylindrical member. A rotor shaft is attached to the rotor shaft support structure. The electric machine further comprises bearings to locate and support the rotor shaft relative to the housing.

11 Claims, 13 Drawing Sheets

Related U.S. Application Data continuation of application No. 15/327,691, filed as application No. PCT/US2015/041241 on Jul. 21, 2015, now abandoned.

(60) Provisional application No. 62/049,105, filed on Sep. 11, 2014, provisional application No. 62/027,100, filed on Jul. 21, 2014.

(51) Int. Cl.
| | |
|---|---|
| *F28F 25/06* | (2006.01) |
| *F28F 25/10* | (2006.01) |
| *H02K 1/32* | (2006.01) |
| *H02K 3/30* | (2006.01) |
| *H02K 5/10* | (2006.01) |
| *H02K 7/14* | (2006.01) |
| *H02K 9/02* | (2006.01) |
| *H02K 9/04* | (2006.01) |
| *H02K 9/06* | (2006.01) |
| *H02K 9/22* | (2006.01) |
| *F28F 25/00* | (2006.01) |

(52) U.S. Cl.
CPC ............... *H02K 1/32* (2013.01); *H02K 3/30* (2013.01); *H02K 5/10* (2013.01); *H02K 7/14* (2013.01); *H02K 9/02* (2013.01); *H02K 9/22* (2013.01); *H02K 9/227* (2021.01); *F28C 2001/006* (2013.01); *F28F 2025/005* (2013.01); *F28F 2250/08* (2013.01)

(58) Field of Classification Search
CPC ........ H02K 2205/09; H02K 1/20; H02K 3/24; H02K 5/20; H02K 5/203; H02K 3/30; H02K 3/32; H02K 3/325; H02K 3/345; H02K 3/34
See application file for complete search history.

(56) References Cited

U.S. PATENT DOCUMENTS

| | | | |
|---|---|---|---|
| 2002/0074871 | A1 | 6/2002 | Kikuchi et al. |
| 2005/0134130 | A1* | 6/2005 | Tsai ................. H02K 5/18 310/58 |
| 2006/0043801 | A1 | 3/2006 | Adra |
| 2008/0012436 | A1* | 1/2008 | Neal ............... H02K 9/225 310/90 |
| 2008/0197725 | A1 | 8/2008 | Husband et al. |
| 2009/0108702 | A1* | 4/2009 | Mock .............. H02K 21/14 310/216.069 |
| 2010/0019588 | A1* | 1/2010 | Makino ........... H02K 15/12 310/52 |
| 2011/0025147 | A1* | 2/2011 | Owng .............. H02K 5/207 310/63 |
| 2013/0278088 | A1* | 10/2013 | Bahr .............. H02K 15/0043 310/52 |
| 2014/0130535 | A1 | 5/2014 | Santoro |
| 2014/0197701 | A1* | 7/2014 | Hossain ........... H02K 9/223 310/52 |
| 2014/0239753 | A1* | 8/2014 | Buehler .......... H02K 9/223 264/261 |

OTHER PUBLICATIONS

Timtronics, Webpage Printout, Dec. 2013 (Year: 2013).*
Koyakata, Machine Translation of JP2010057211, Mar. 2010 (Year: 2010).*
Australian Examination report No. 1 for standard patent application in corresponding Australian Patent Application No. 2015292779, dated Oct. 2, 2019, 3 pages.
Australian Examination report No. 1 for standard patent application in corresponding Australian Patent Application No. 2020250219, dated Apr. 8, 2022, 4 pages.
Australian Examination report No. 1 for standard patent application in corresponding Australian Patent Application No. 2020250219, dated Aug. 31, 2022, 3 pages.

* cited by examiner

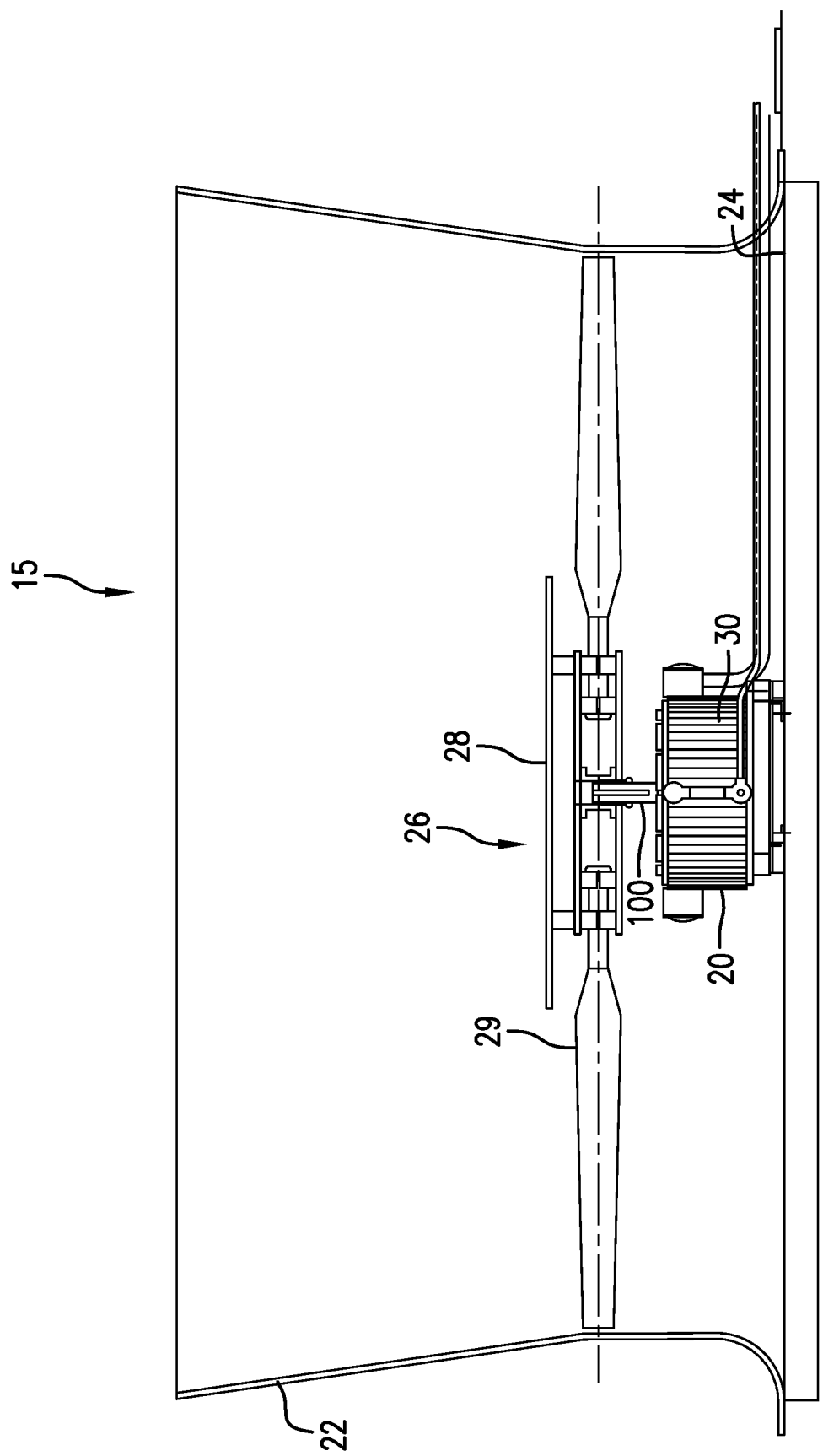

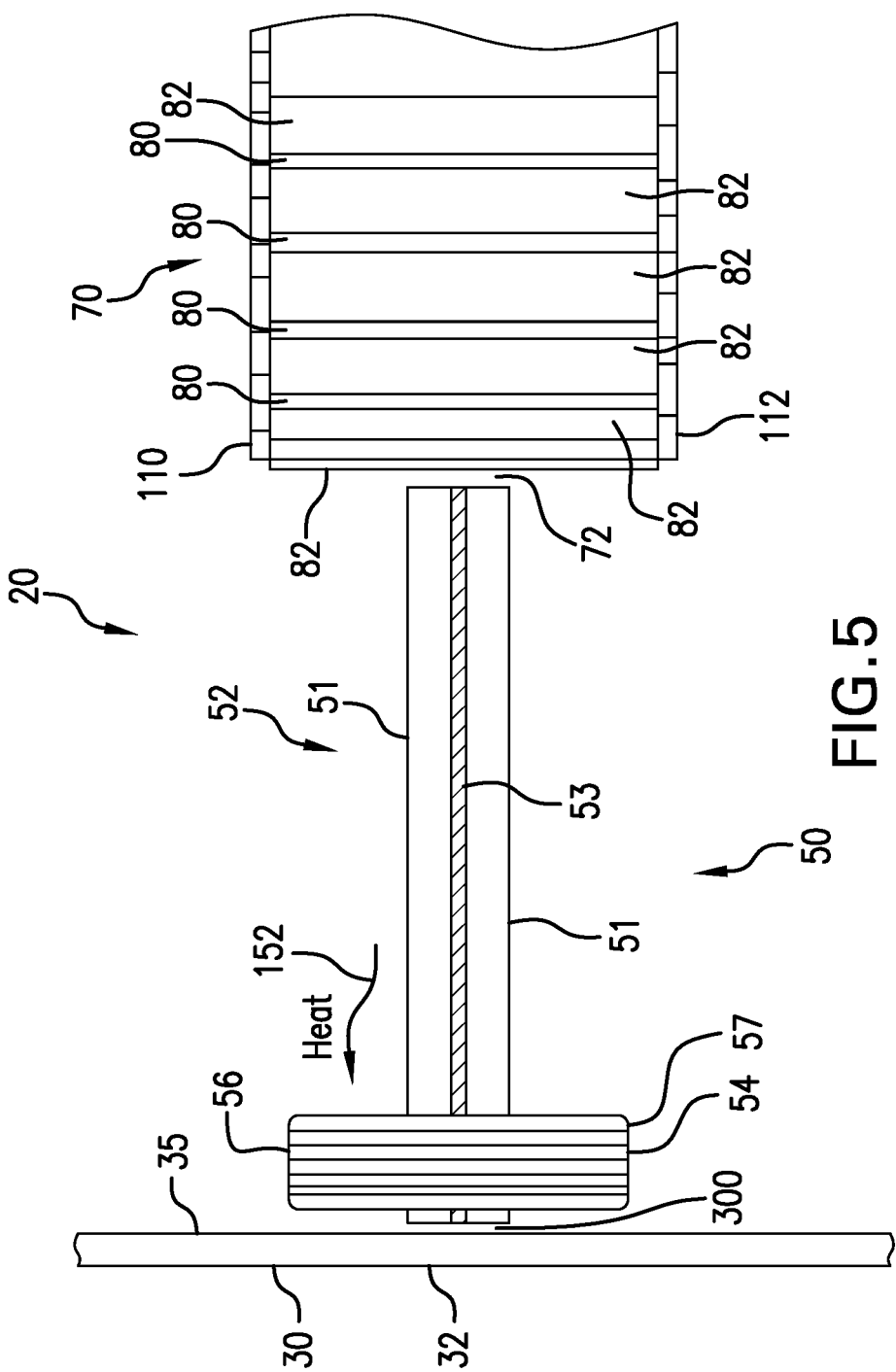

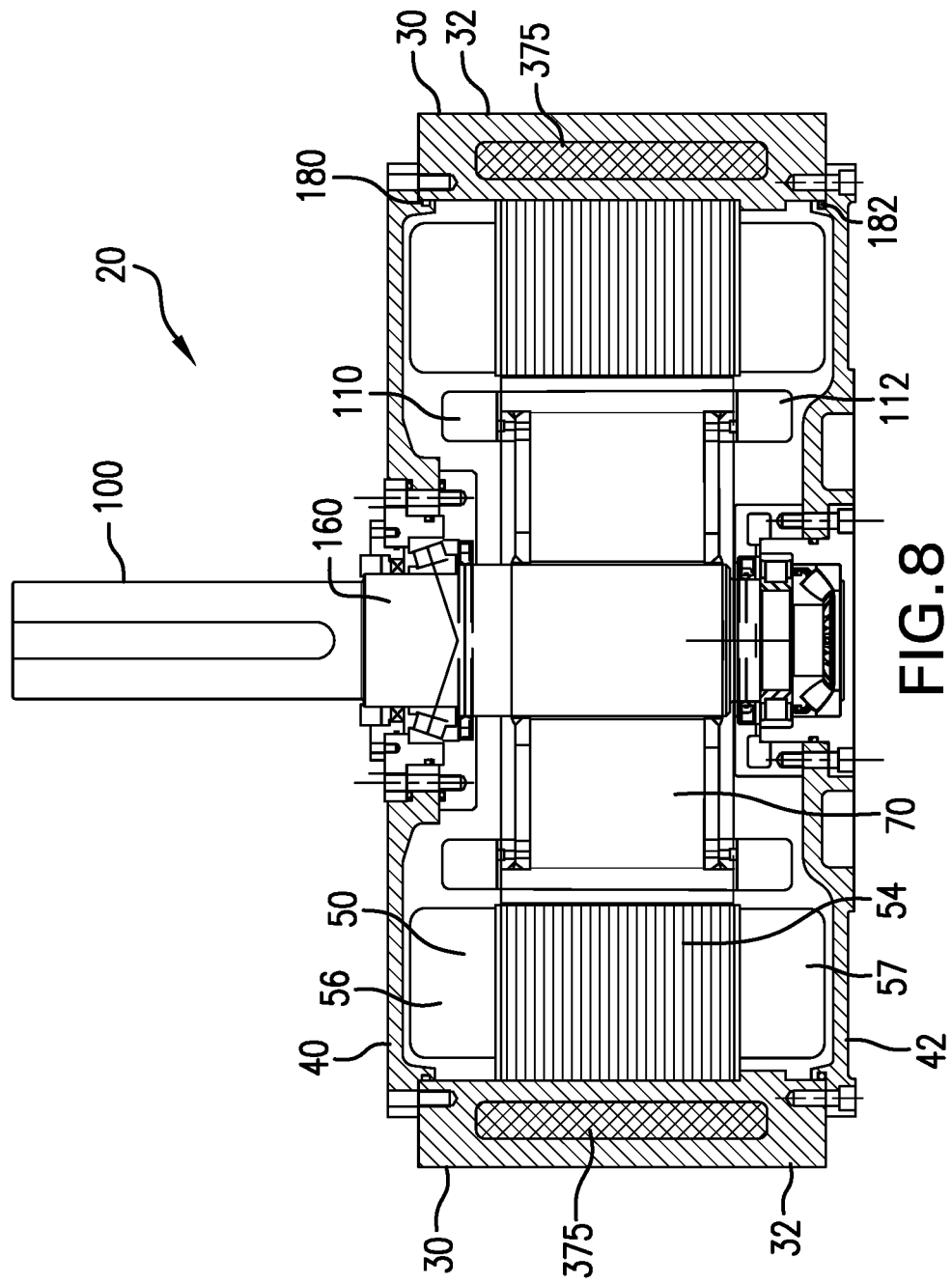

SEALED, SELF-COOLING-MOTOR WITH CONDUCTIVE HEAT TRANSFER THERMAL MANAGEMENT CAPABILITY

CROSS-REFERENCE TO RELATED APPLICATIONS

This application is a continuation of U.S. patent application Ser. No. 16/885,075 filed May 27, 2020; this application also claims the benefit of and priority to U.S. Patent Application Ser. No. 62/027,100, filed Jul. 21, 2014 and U.S. Patent Application Ser. No. 62/049,105, filed Sep. 11, 2014. The entire disclosures each of the above-referenced applications are hereby incorporated by reference as if fully set forth herein.

TECHNICAL FIELD

The present invention is directed to methods and apparatuses for effecting heat transfer in any electrical machine that comprises a stator and a rotor that cooperate to produce flux.

BACKGROUND ART

During operation of power dense electric machines having a stator and a rotor, excessive heat may be generated in the stator windings or in other portions of the electric machine. In order to prevent such excessive heat from damaging the power dense electric machine, reducing its performance or shortening its operational life, it is necessary to reduce or remove such heat. In cooling towers using direct-drive motors to directly drive the fans, the motors must have a predetermined height so that the motor can fit under the fan and position the fan at the correct position in the fan stack. Such motors have relative large diameters so that the motor can be built with the required height. However, small diameter motor cooling techniques do not scale directly to large power dense motors due to the distance the heat must travel before the heat is transferred to the environment. Relatively large power dense electric machines, such as large power dense motors, produce relatively large heat loads. Auxiliary cooling systems are typically used to remove or reduce this heat in relatively large power dense motors. However, such auxiliary cooling systems add complexity, weight and cost to relatively large power dense motors. Furthermore, such auxiliary cooling systems may be limited in applications such as in cooling towers, skyscrapers and other tall buildings wherein weight and wind loads are limited by the load limits of the structure. Additionally, auxiliary motors that propel additional fans for cooling may be limited in explosive environments due to the spark created by the motor.

Therefore, what is needed is an improved large power dense electric machine that addresses the issue of excessive heat build-up without adding complexity, weight and cost to the large power dense electric machine.

DISCLOSURE OF THE INVENTION

The present invention provides techniques, schemes and methods for removing or reducing heat in an electrical machine may be realized in any electric machine that comprises a stator and a rotor and creates flux.

In some embodiments, the present invention is directed to an improved power dense motor that may be used in any one of a variety of industrial applications. For example, the improved power dense motor of the present invention may be used to directly drive a fan in a wet cooling tower or an induced-draft or forced-draft air-cooled heat exchanger. The improved power dense motor may be used in wet or dry applications and be positioned so that the motor shaft is arranged in a vertical or horizontal orientation, or at any angle between vertical or horizontal orientation.

In some of the embodiments of the present invention, the power dense motors of the present invention described in the ensuing description have either surface magnets or alternate interior permanent magnets. However, it is to be understood that the techniques, schemes and methods for reducing or removing heat in the power dense motor described herein also applies to motors that do not utilize magnets.

In some embodiments, the present invention is directed to an electric machine comprising a housing that has an interior space and an interior wall extending about the interior space, and a stator assembly disposed within the interior space and attached to the interior wall. The electric machine includes a rotor within the interior space and located radially inward from the stator. The rotor and stator define a gap there between and cooperate to produce flux. The rotor comprises a hollow cylindrical member having an interior region, an interior wall extending about the interior region and an exterior surface. The rotor includes magnets attached to the exterior surface and a rotor shaft support structure disposed within the interior region and attached to the interior wall of the hollow cylindrical member. A rotor shaft is attached to the rotor shaft support structure. The electric machine further comprises bearings to locate and support the rotor shaft relative to the housing.

BRIEF DESCRIPTION OF THE DRAWINGS

FIG. 1 is a side elevational view of a wet cooling tower that utilizes a motor in accordance with one embodiment of the present invention;

FIG. 5 is a diagram illustrating the path of heat flow in the motor, the view showing only portions of the stator and rotor;

FIG. 8 is a side view, partially in cross-section, of a motor in accordance with another embodiment of the present invention;

BEST MODE FOR CARRYING OUT THE INVENTION

Figure 2A:
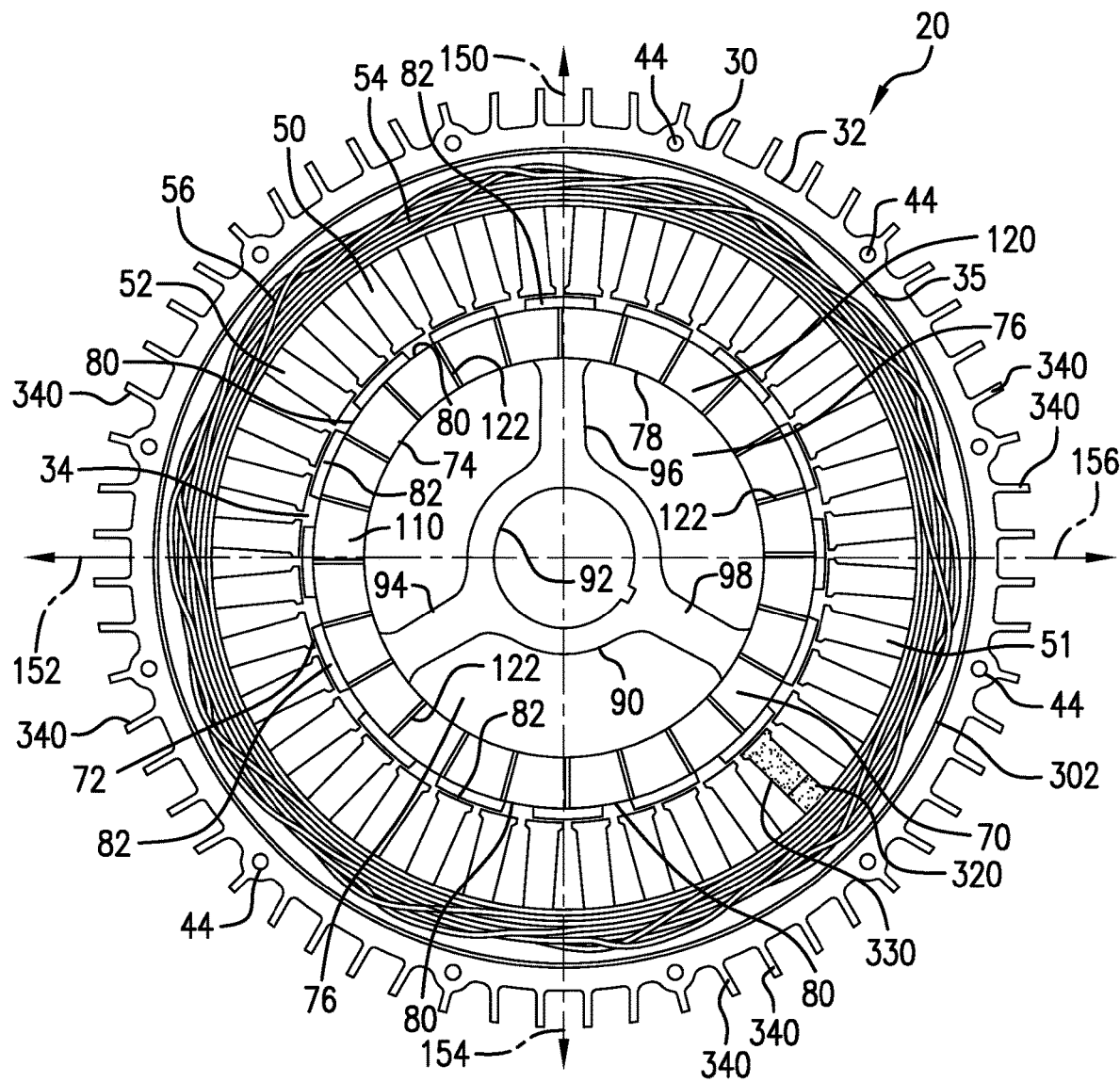
FIG. 2A is a plan view of the interior of the motor, the shaft and top cover of the motor not being shown so as to facilitate viewing of the interior of the motor.

It is well known in the industry that motors have "housings" or "casings" that contain the internal components in the motor, such as the stator and rotor. As used herein, the terms "casing" or "motor casing", "housing" or "motor housing" all have the same meaning and are used interchangeably.

Although the ensuing description is in terms of the power dense motor of the present invention being used in a cooling tower, it is to be understood that there are a substantial number of applications in which the power dense motor of the present invention may be used.

Wet cooling towers are described in U.S. Pat. No. 8,111,028 entitled "Integrated Fan Drive System For Cooling Tower" and international application no. PCT/US2012/061244 entitled "Direct Drive Fan System With Variable Process Control" and published under International Publication No. WO 2013/059764. The entire disclosure of U.S. Pat. No. 8,111,028 is hereby incorporated by reference. The entire disclosure of international application no. PCT/US2012/061244 is hereby incorporated by reference.

Cooling tower motors operate in all kinds of extreme conditions, such as extreme cold, ice, high humidity, exposure to water and other fluids and excessive heat. Therefore, thermal management of the motor is required for proper motor operation and efficiency.

Referring to FIG. 1, there is shown a basic block diagram of cooling tower 15 that utilizes power dense motor 20 of the present invention. Cooling tower 15 includes fan stack 22, fan deck 24 and fan 26. Fan stack 22 is connected to fan deck 24. Fan 26 has fan hub 28 and fan blades 29 that are connected to fan hub 28. Motor 20 has rotatable shaft 100 that directly drives fan 26. Fan 26 rotates within fan stack 22. Motor 20 includes casing 30 which has exterior surface 32. The height of power dense motor 20 must be in a predetermined range in order to maintain the height of fan 26 in fan stack 22 for sealing and fan performance. Motor 20 is relatively large in diameter in order to produce a significant torque to cause rotation of fan 26. Cooling tower 20 is a "wet cooling tower" which uses the latent heat of evaporation to cool process fluids. Process fluids are fluids that are used in a process, e.g. cracking crude, chemical processing, etc.

Motor 20 utilizes a novel motor architecture and particular materials that cooperate to (i) prevent heat from deleteriously affecting the heat-sensitive permanent magnets on the rotor, and (ii) transfer heat out of motor 20 by using conduction and convection and by creating a heat path from the source of heat in the motor to a heat sink. These features of motor 20 are discussed in detail in the ensuing description.

Figure 2B:
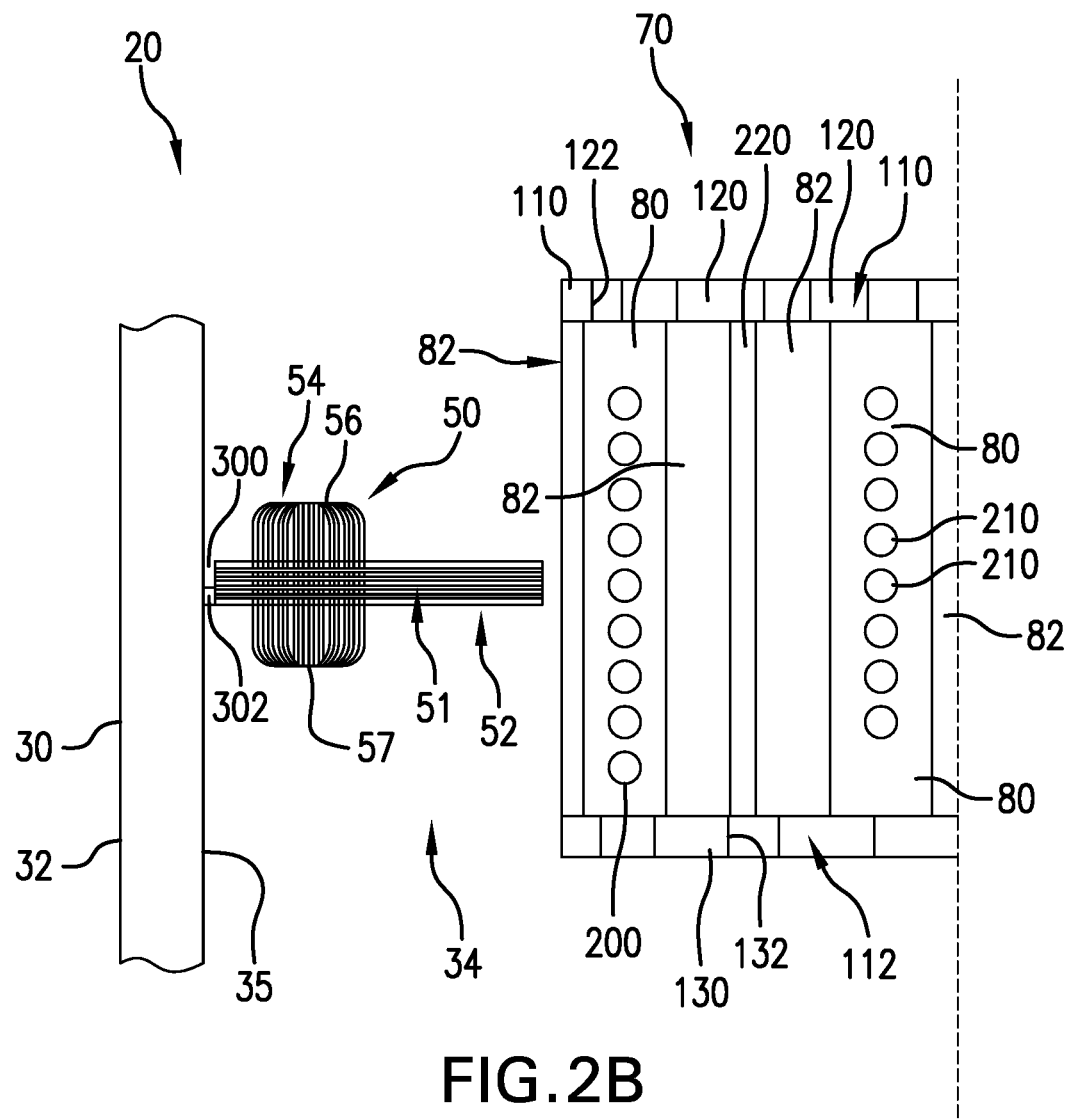
FIG. 2B is a diagram showing portions of the stator and rotor in accordance with one embodiment of the present invention.

FIG. 2A shows a plan view of the interior of motor 20 in accordance with one embodiment of the present invention. Rotor 70 and top cover 40 of motor 20 are not shown in order to facilitate viewing of the interior of motor 20. Motor 20 produces the required torque to directly drive fan 26 (see FIG. 1). Motor 20 comprises housing or casing 30. Housing 30 has an interior space 34 and interior wall 35 that extends about interior space 35. Housing 30 includes cover 40 and cover 42. If motor 20 is positioned so that shaft 100 is oriented upward, cover 40 is referred to as the "top cover" and cover 42 is referred to as the "bottom cover". Casing 30 has bolt holes 44 for receiving bolts (not shown) that are used to attach covers 40 and 42 to casing 30. Referring to FIGS. 2A, 2B and 5, motor 20 further comprises stator assembly 50 that is disposed within the interior space 34 and located radially inward from interior wall 35. Stator assembly 50 is attached to interior wall 35. Stator assembly 50 comprises a plurality of lamination sheets 51 stacked together to form stator stack 52. In one embodiment, each lamination sheet is made from 26 gauge magnetic steel and has a thickness of about 0.0185 inch or 18.5 mils. In another embodiment, each lamination sheet 51 is fabricated from 29 gauge magnetic steel and has a thickness of 14 mils. In a further embodiment, each lamination sheet is fabricated from 24 gauge magnetic steel and the thickness is 25 mils. In a preferred embodiment, the lamination sheets are bonded together with a silicone epoxy resin having a thermal conductivity of at least 0.7 W/m-c. Stator stack 52 is configured as a deep-slot stack of laminations. This feature is discussed in detail in the ensuing description. In one embodiment, each lamination 51 is fabricated from 26 gauge magnetic steel and is formed with thirty-six slots per lamination. Stator assembly 50 further comprises windings or coils 54 that are wound about the stator stack 52. As used herein, the terms "windings" or "coils" have the same meaning and are used interchangeably. Windings 54 have end turns 56 and 57.

Figure 3A:
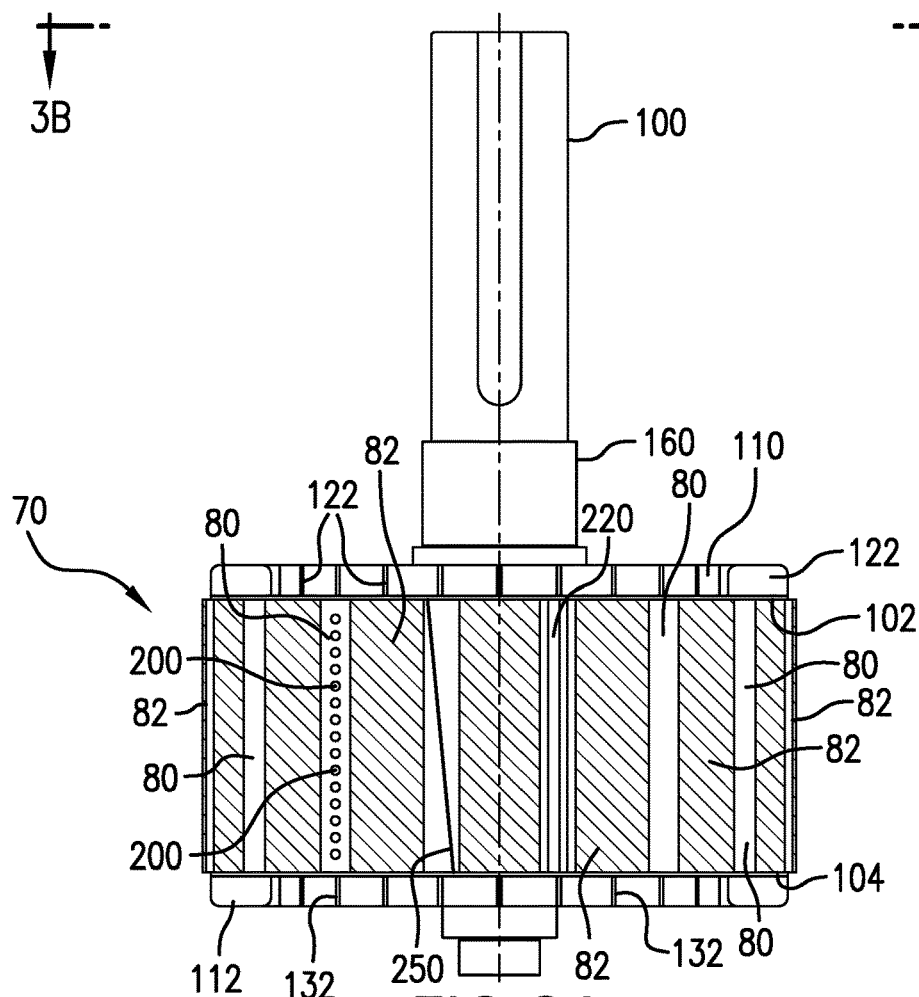
FIG. 3A is a side elevational view of a rotor in accordance with one embodiment of the present invention.
Figure 3B:
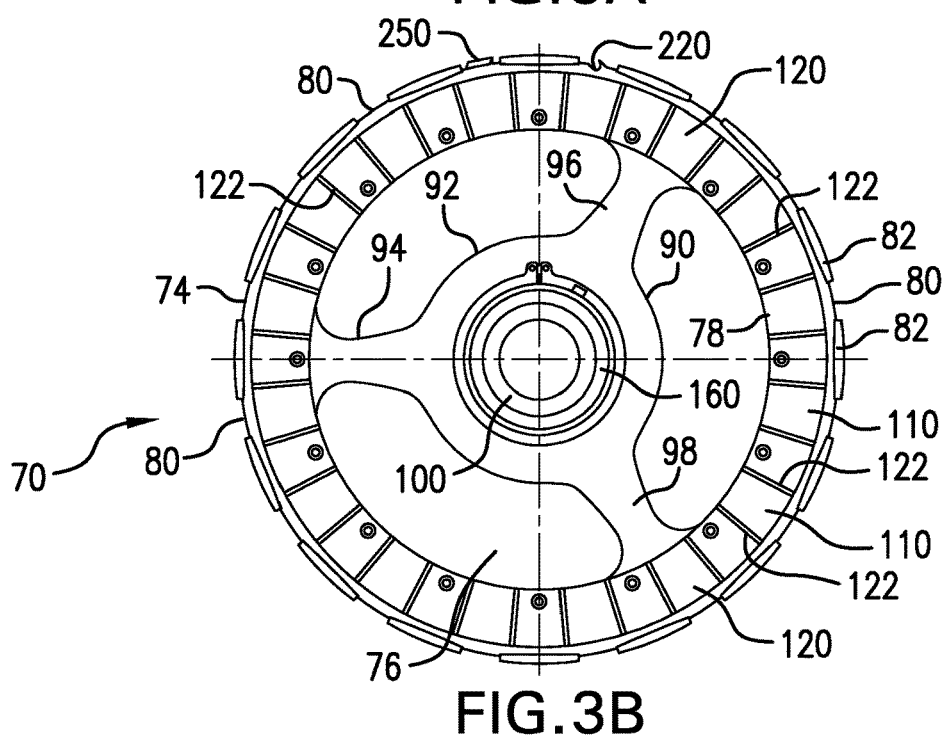
FIG. 3B is a view of the rotor taken along line 3B-3B in FIG. 3A.
Figure 4A:
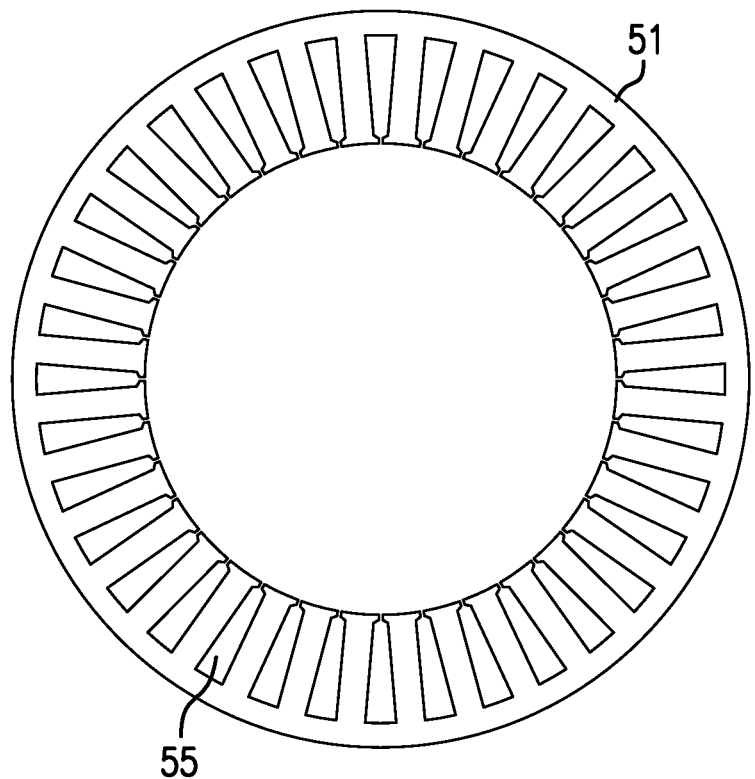
FIG. 4A is a plan view of lamination sheet used to form the stator.
Figure 4B:
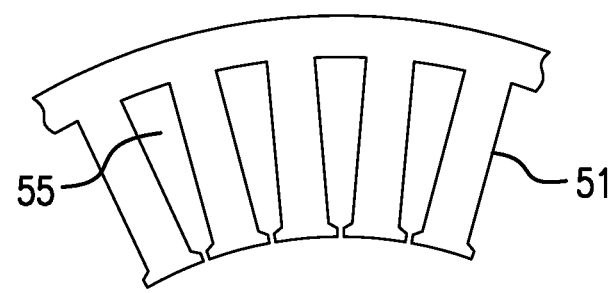
FIG. 4B is an enlarged view of a portion of the view shown in FIG. 4A.
Figure 6A:
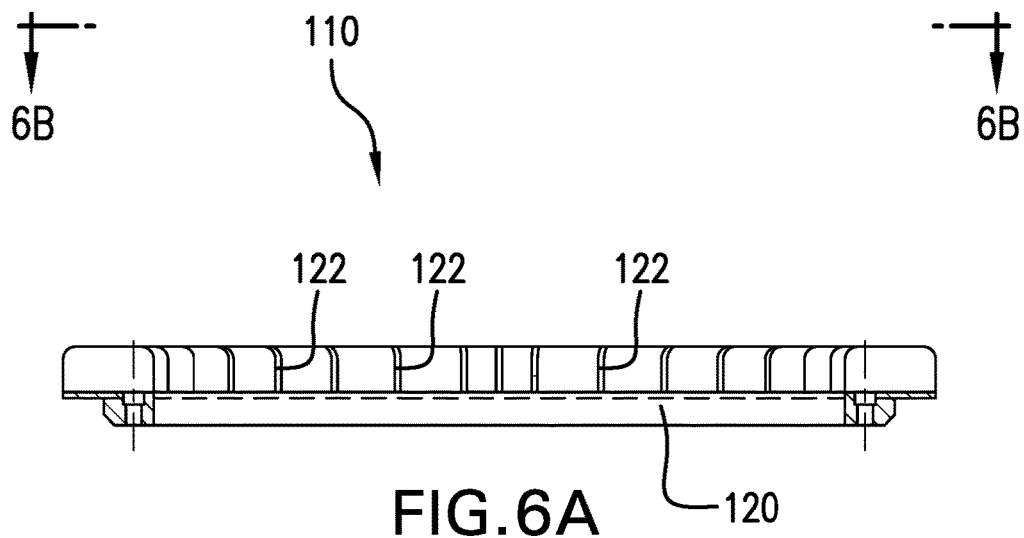
FIG. 6A is a side view of a fan structure that is attached to the rotor.
Figure 6B:
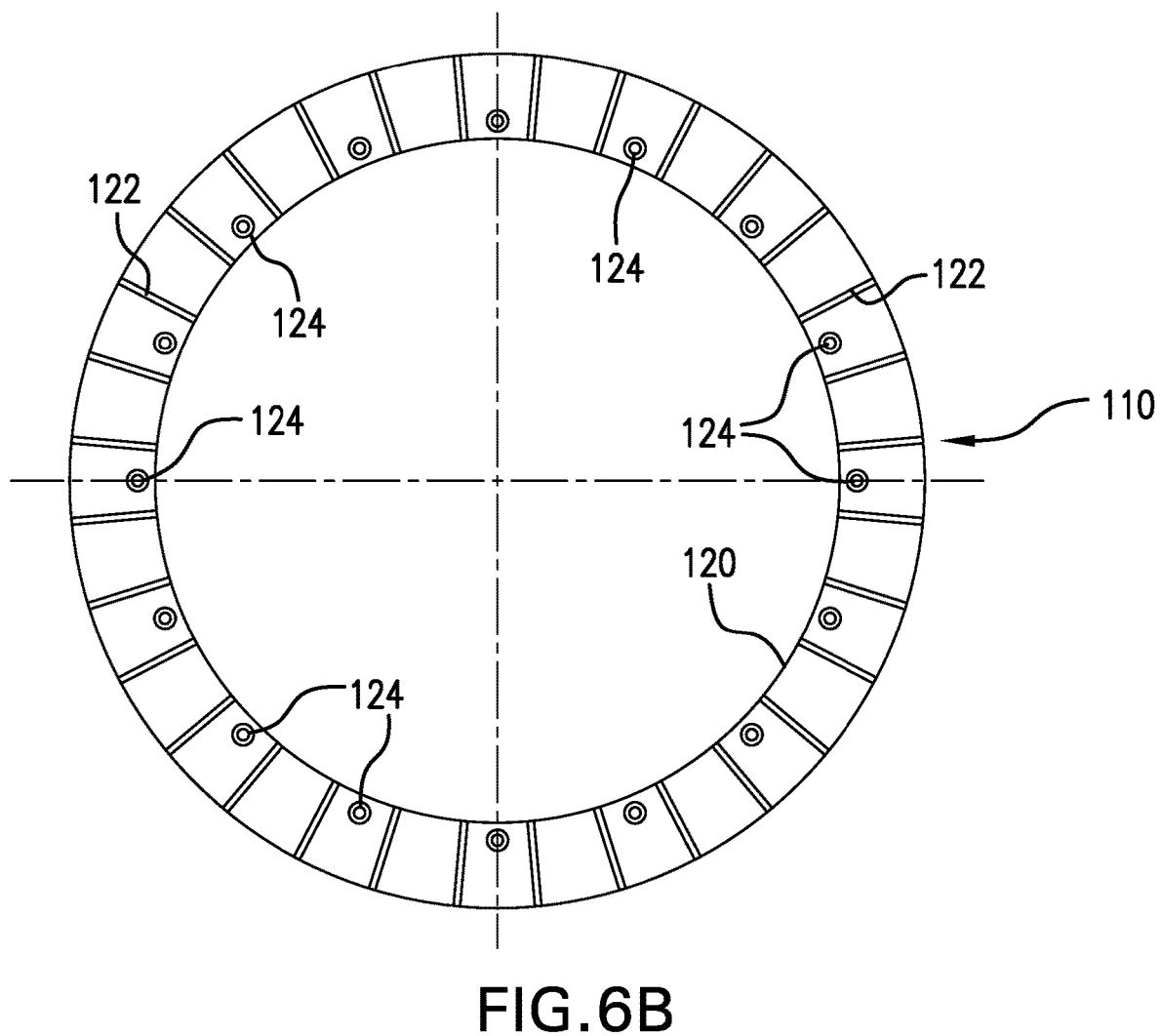
FIG. 6B is a plan view taken along line 6B-6B of FIG. 6A.

Referring to FIGS. 2, 3A and 3B, motor 20 further comprises rotor 70. Rotor 70 and stator assembly 50 are arranged and sized to allow creation of gap 72 that is between stator assembly 50 and rotor 70. It has been found superior motor performance is achieved by a gap 72 of 0.060 inch. Rotor 70 comprises hollow cylindrical member 74 that has interior region or space 76, an interior wall 78 extending about interior region 76 and exterior surface 80. Rotor 70 further comprises a plurality of magnets 82 attached to exterior surface 80. Exterior surface 80 extends about the circumference of hollow cylindrical member 74. In a preferred embodiment, magnets 82 are equidistantly spaced apart. In one embodiment, magnets 82 are surface permanent magnets. In an alternate embodiment, magnets 82 are interior permanent magnets instead of surface magnets. Rotor 70 further comprises a rotor shaft support structure 90 that is located within interior region 76 and attached or connected to interior wall 78 of hollow cylindrical member 74. Support structure 90 comprises a central section 92 and radially extending sections 94, 96 and 98 that are attached to interior wall 78. Rotor 70 further comprises rotor shaft 100 that is attached or connected to central section 92. In another embodiment, rotor shaft 100 is integral with rotor shaft support structure 90. Hollow cylindrical member 74 has first end 102 and opposite second end 104. Rotor 70 further comprises fan structure 110 that is attached to first end 102 of hollow cylindrical member 74 and fan structure 112 that is attached to second end 104 of hollow cylindrical member 74. Fan structure 110 comprises annular body section 120 and a plurality fan blades 122 attached to annular body section 120. Similarly, fan structure 112 comprises annular body section 130 and a plurality of fan blades 132 that are attached to the annular body section 130. In one embodiment, circulation fan structures 110 and 112 are attached or connected to ends 102 and 104, respectively, of hollow cylindrical member 74 by any suitable technique, e.g. bolts, rivets, screws, welding, etc. Each fan structure 110 and 112 has through-holes or openings for receiving fastener devices such as screws, bolts, etc. For example, fan structure 110 has through-holes or openings 124 for receiving such fastening devices. In another embodiment, fan structures 110 and 112 are not separate components but instead, are integral with hollow cylindrical member 74. As rotor 70 rotates, fan structures 110 and 112 circulate air around magnets 82 and interior space or region 34 of casing 32 in order to create a heat path from the rotor 70 to casing 32 so as to cause a transfer of heat from rotor 70 to motor casing 32. In such an embodiment, housing or casing 32 functions as a heat sink which can be adjusted in surface area and thermal mass to accommodate motor thermal design requirements. This is illustrated by arrows 150, 152, 154 and 156, shown in FIG. 2A, which represent the direction of the flow of heat. Thus, fan structures 110 and 112 function to remove heat from magnets 82 and prevent magnets 82 from becoming saturated with heat which could reduce the power of motor 20. Since motor 20 has a relatively large diameter, windings or coils 54 are located near housing or casing 32 so as to prevent windings 54 from absorbing the heat transferred from magnets 82 by fan structures 110 and 112. The number of fan blades 122 and 132 depends upon the particular thermal characteristics of motor 20. The particular fan design (e.g. axial, centrifugal, etc.) of fan blades 122 and 132 and the degree of angulation of fan blades 122 and 132 also depends upon the particular thermal characteristics of motor 20 and the fact that the fan must circulate air in both motor directions due to de-ice service of the motor which operates in the reverse direction and to maintain positive pressure in the motor casing 32. As rotor 70 rotates, fan structures 110 and 112 mix the air in internal space or region 34 to effect convective cooling. Fan structures 110 and 112 also produce positive pressure within internal space or region 34 which prevents explosive gases and contaminates from entering motor 20. Thus, in an alternate embodiment, fan structure 110 is configured to mix the air within the motor while rotor 70 is rotating clockwise and fan structure 112 is configured to mix the air within the motor while rotor 70 is rotating counter-clockwise. In another embodiment, fan structures 110 and 112 are configured so that the pitch of fan blades 122 and 132, respectively, can be adjusted to optimize air-flow as a function of speed and direction.

In an alternate embodiment, only one fan structure is attached to hollow cylindrical member 74. In such an embodiment, either fan structure 110 or fan structure 112 is used, but not both. In an alternate embodiment, hollow cylindrical member 74 is formed with a single integral fan structure.

In an alternate embodiment, fan structure 110 has only one blade 122 and fan structure 112 has only one blade 132.

In an alternate embodiment, motor 20 includes a Pall PFD Reservoir Vent Filter that works in conjunction with fan structures 110 and 112. Such an embodiment is described in the ensuing description.

Referring to FIGS. 3A, 8, 9A and 9B, motor 20 includes seal device 160 to seal rotor shaft 100 around top cover 40. Seal device 160 is configured to match thermal expansion and contraction of top cover 40. In one embodiment, seal device 160 is an Inpro® Seal. In a preferred embodiment, rotatable shaft 100 is sealed at cover 40 by the seal configuration that is described in the aforementioned international application no. PCT/US2012/061244. Rotor shaft 100 is configured to be connected or joined to cooling tower fan 26. The techniques and configurations for connecting rotor shaft 100 cooling tower fan 26 are known in the art and therefore are not discussed here in detail. Continuous O-ring 180 seals the joint between top cover 40 and casing 30 to ensure a proper seal at all times and temperature extremes. Similarly, continuous O-ring 182 seals the joint between bottom cover 42 and casing 30 to ensure a proper seal at all times and temperature extremes.

Referring to FIGS. 2A and 5, casing 30 functions as a heat sink for the heat produced by windings 54 that are located in deep slot stator laminations 51. Casing or housing 30 is fabricated from a thermally conductive material that exhibits above-average heat sinking characteristics and, in particular, has the required thermal mass to attract and sink the heat produced in interior space 34 of motor 20. In one embodiment, casing or housing 30 is fabricated from cast iron. However, it is to be understood that other metals or alloys may be used to fabricate casing 30 depending upon the particular environment in which motor 20 is used. For example, in HVAC applications, it is preferred if casing 30 is fabricated from metals such as Aluminum or Magnesium. The thermally conductive material from which casing 30 is fabricated has sufficient thermally conductive properties to draw heat through stator gap 300 even when thermally conductive and electrically insulating material is disposed in stator gap 300.

In one embodiment, stator gap 300 is potted to interior wall 35 of casing 30 with a silicone-based potting material 302. One suitable silicone-based potting material 302 is "Thermade TP500" or equivalent which has excellent conductive thermal coupling properties.

Referring to FIG. 8, in another embodiment, heat transfer media 375 is disposed between the motor casing walls or covers to enhances transfer of motor heat to casing 30 and ultimately to the external environment. Heat transfer media 375 is similar to a water jacket (without a pump). The heat transfer media can be a "phase transfer substance" (e.g. sodium-filled exhaust values) which is described in U.S. Pat. No. 4,459,949 entitled "Liquid Metal Cooled Internal Combustion Engine Valves With Getter", the disclosure of which patent is hereby incorporated by reference.

In an alternate embodiment, pressurized water from the cooling tower is circulated in a water jacket to heat and cool the motor, avoiding the cost and weight of a pumping system. In a preferred embodiment, the cooling tower water is used with a heat exchanger so that the closed loop fluid circulated in the motor jacket can be mixed with an anti-freeze as required for cold service. In a further embodiment, the pressurized hot water returned from the process can be combined with the pressurized return of cooler water from the basin feed to the process to provide a suitable temperature via mixing valves and thermostats. A third make-up water source can be used as required to provide a suitable temperature to the motor (hot or cold) to maintain optimum motor efficiency through various environmental conditions and process loads.

In one embodiment, a thermal barrier coating is applied to motor components such as magnets 82 and rotor 70 to prevent these components from being saturated with heat. The thermal barrier coating also functions as a protective coating for magnets 82. One suitable thermal barrier coating is described in U.S. Pat. No. 4,055,705, entitled "Thermal Barrier Coating System", the disclosure of which patent is hereby incorporated by reference.

Referring to FIGS. 2B and 3A, in another embodiment, through-holes 200 are formed on rotor 70 between the magnet lands, or elsewhere, in order to create air-flow to transfer heat from magnets 82. Through-holes 200 allow air to pass from the inside of rotor 70 to the outside of rotor 70 so as to produce air circulation about the magnets 82. In this embodiment, rotor 70 is also configured with dimples 210 to produce air circulation or swirl that effects transfer of heat from the magnets 82. It is to be understood that rotor 70 may be configured with only through-holes 200 or only dimples 210 or both through-holes 200 and dimples 210. The aforementioned through-holes 200 and dimples 210 may be configured with different geometries, orientations and routes from the centerline of the rotor axis.

Referring to FIGS. 2B, 3A and 3B, in another embodiment, rotor 70 is configured with at least one cooling groove 220 between the magnet lands. Cooling groove 220 may have any geometry and orientation with respect to the centerline of the rotor axis in order to produce the desired air circulation.

Referring to FIG. 3A, in one embodiment, rotor 70 is configured with at least one cooling blade 250 between the magnet lands. Cooling blade 250 may be configured to have any geometry and orientation with respect to the centerline of the rotor axis in order to produce the desired air circulation.

Referring to FIGS. 2A, 2B, 4A, 4B and 5, the large diameter of the motor required by a direct-drive fan application provides stator stack 52 that comprises a plurality of deep slot laminations 51 that are used to locate or position windings or coils 54 and their end turns 56 and 57 as close as possible to casing 30, which is a heat sink, and away from magnets 82. Each lamination 51 has slot 55 through which coils 54 are wound. Deep slot laminations 51 are made to a diameter slightly less than that of the interior diameter of casing 30 so as to minimize gap 300 between stator assembly 50 and interior wall 35 of casing 30. In one embodiment, gap 300 is filled with a thermally conductive potting 302 that is also an electrical insulator. A suitable thermally conductive potting material is described in the article entitled "How to Increase a Motor's Continuous Torque Output and Power Density By Potting its Stator with Thermally Conductive Epoxy," R. Welch, Proceedings of the 2006 SMMA Fall Conference, Saint Louis, Mo. Another suitable thermally conductive material for use in gap 300 is STYCAST 2850 MT epoxy resin which is described in U.S. Pat. No. 7,262,536, entitled "Gearless Wheel Drive Motor System", the disclosure of which patent is hereby incorporated by reference. Another suitable thermally conductive potting material is Thermade™ Conductive Gap Filler (TP500-Series) which has a thermal conductivity of 5.0 W/m K and manufactured by Thermade Technology Co. Ltd. of China. In another embodiment of the invention, winding 54 are potted with a resin manufactured by Crosslink Technology under the product number CLS9310. This resin has a thermal conductivity of 0.293 (W/m K). Another suitable resin is the High Thermal Epoxy Resin 50-3100 which has a thermal conductivity of 2.16 (W/m K) and is used in semi-conductor industry. In another embodiment, windings 54 are wrapped in a thermally conductive insulator such as Thermade TC 45G (thermal conductivity of 0.8 W/mk) or Polymer Science Inc. PS-1510 (thermal conductivity of 0.75 W/mk). Alternately, windings 54, once formed, could be encased in a silicone sheath which would provide excellent electrical insulating properties combined with good thermal conductivity. Alternate materials for the sheath are Nylon, Teflon and other similar materials having the operating temperature profile of windings 54 and acceptable sealing properties and abrasion resistance.

Referring to FIGS. 2A, 4A, 4B and 5, due to the particular structure of the deep slot stator laminations 51 and the resulting stator stack 52, the height of the motor can be maintained within a predetermined range of heights. This allows motor 20 to position the cooling tower fan at the correct height within fan stack 22 in order to achieve optimum sealing and fan performance on the fan stack. The required height of the cooling tower fan is further discussed in the aforementioned international patent application publication no. PCT/US2012/061244.

In one embodiment, silicone epoxy resin 53 is applied between deep slot stator laminations 51. A silicone epoxy resin is both a good electrical insulator and thermal conductor which allows stator stack 52 into a thermal block that transfers heat both radially through the lamination as well as through the epoxy resin 53 to adjoining laminations. Silicone epoxy resin provides a flexible and expandable joint having the required electrical insulation and relatively high heat conductivity while providing the required mechanical bond. Such a configuration improves heat transfer of the stator stack 52 into a thermal block.

The impedance of heat transfer may be desired in some applications wherein motor 20 operates in relatively cold environments and motor freezing is an issue. Therefore, in another embodiment of the invention, two types of resins may be applied along the radius of the deep slot stator laminations 51. In such an embodiment, one resin 320 improves heat transfer at certain locations, such as at the location of the heat producing winding 54, to provide a good thermal block and conductive heat transfer to casing 30 which is a heat sink and the other resin 330 impedes heat transfer toward magnets 82. This is illustrated in FIGS. 2A and 5. Resin 320 is applied to the portions of lamination 51 that are covered by winding 54 and near casing 30 which is a heat sink. Resin 330, on the other hand, is applied to the portion of the radius of lamination 51 that is between winding 54 and gap 72. This method provides for "thermal tuning" of the motor based on motor heat transfer needs, required heat rejection to the surroundings and motor operations in hot and cold environments.

In a wet cooling tower, the air flow in the vicinity of motor 20 is about 100% humid and entrained with water droplets. As shown in FIGS. 1, 2A, 7A, 7B and 13, casing or housing 30 is configured with scalloped radial cooling fins 340 on exterior surface 32 that increase the surface area available for the transfer of motor heat to the 100% humidity air flowing along the cooling fins 340. Cooling fins 340 extend radially with respect to the centerline of motor which is defined by the longitudinal axis of rotor 70. Cooling fins 340 are equidistantly spaced and aligned such that cooling fins 340 are parallel to each other. Cooling fins 340 are parallel to the air-flow or air-stream so as to maximize the surface area exposed to the humid airstream to achieve maximum heat transfer. Although the air stream near motor 20 may be turbulent or at a lower velocity, the overall mass flow of air is moving toward fan 26. Thus, it has been found that cooling fins 340 that are parallel to the humid fan airstream, equidistantly spaced about the circumference of casing 30 and aligned with the radial and thermal gradient will maximize surface area, minimize air stream blockage along the casing and optimize the thermal gradient path from the heat source within motor 20 to the environment external to motor 20. In other embodiments, the angle of cooling fins 340 may be varied depending upon the direction of the air-stream.

In a dry cooling tower, described in the aforementioned U.S. Pat. No. 8,188,698, the air flow in the vicinity of motor 20 is dry air and does not contain any water droplets. In such a scenario, cooling fins 340 perform the same function and effect transfer of motor heat to the air flowing along cooling fins 340.

In an alternate embodiment, a heat-dissipation material coating is applied to casing 30 to facilitate transfer of heat from motor 20 into the air flowing along scalloped cooling fins 340.

Figure 7A:
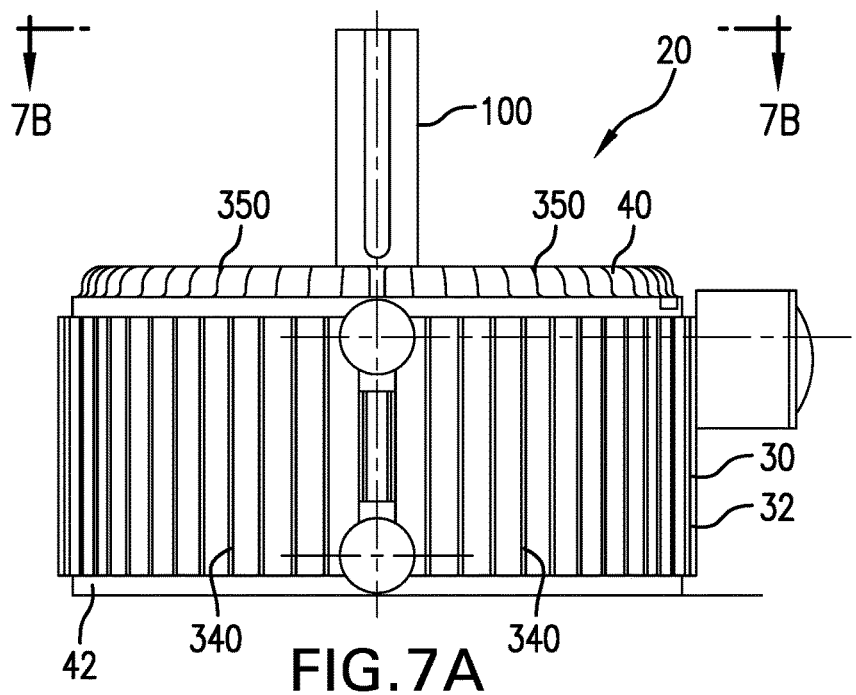
FIG. 7A is a side elevational view of the motor shown in FIG. 1.
Figure 7B:
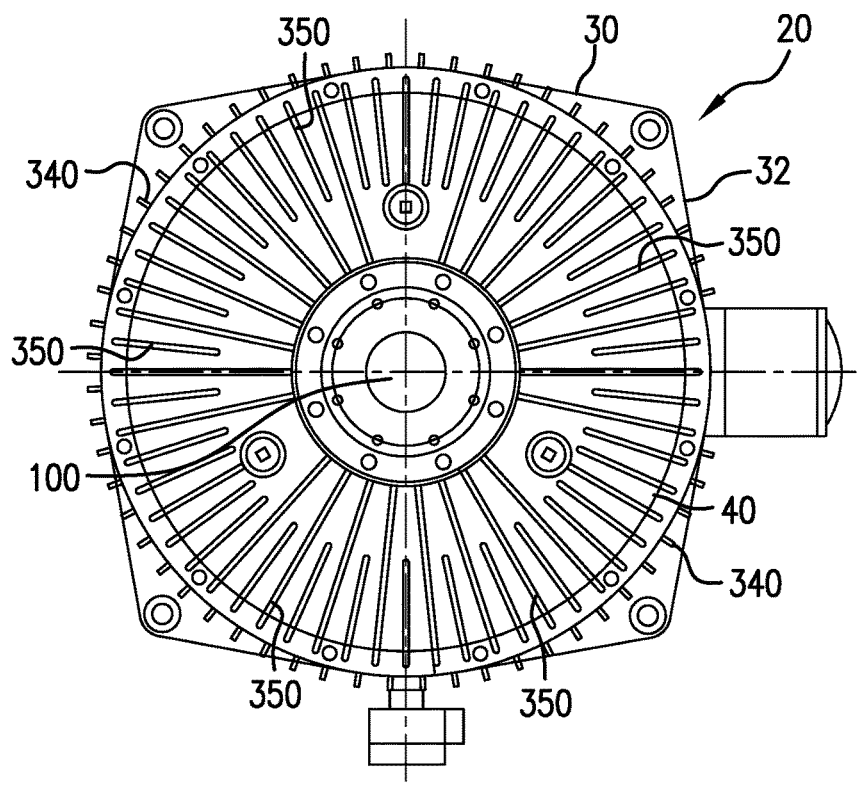
FIG. 7B is a view taken along line 7B-7B of FIG. 7A.

Referring to FIGS. 7A and 7B, in one embodiment, top cover 40 is configured with cooling fin 350 that extend radially with respect to the center line of motor 20. Cooling fins 350 are exposed to the cooling tower airstream and provide maximum surface contact with the 100% humidity airstream which causes a transfer of heat from cover 42 to the airstream. Thus, heat of end turns 56 is transferred to cover 40 and then from cover 40 to the airstream. In a preferred embodiment, bottom cover 42 is also configured with cooling fins that are similar to and function in the same manner as cooling fins 350.

In some embodiments of the invention, a heat dissipation coating is applied to casing 30, top cover 40 and bottom cover 42. This heat dissipation coating effects an additional heat dissipation function which removes heat from casing 30, cover 40 and cover 42 thereby resulting in improved efficiencies, performance and longevity of these components. In one embodiment, the heat dissipation coating is a ceramic bonded, thermal-conductive coating. The heat dissipation coating also prevents corrosion from solvents and chemicals that may come into contact with the heat dissipation coating. One suitable commercially available heat dissipation coating is marketed under the brand name Ruk Black Body and manufactured by Rukse, LLC of Sandy Utah. Another suitable heat dissipation coating is the Swain Tech BBE Heat Emitting Coating manufactured by Swain Tech Coatings, Inc. of Scottsville, NY Another suitable heat dissipation coating is the Cerakote™ Transfer Grey (Air Cure) Ceramic Coating (Item: C-187Q) manufactured by Cerkote™ Ceramic Coatings of White City, Oregon.

Figure 9A:
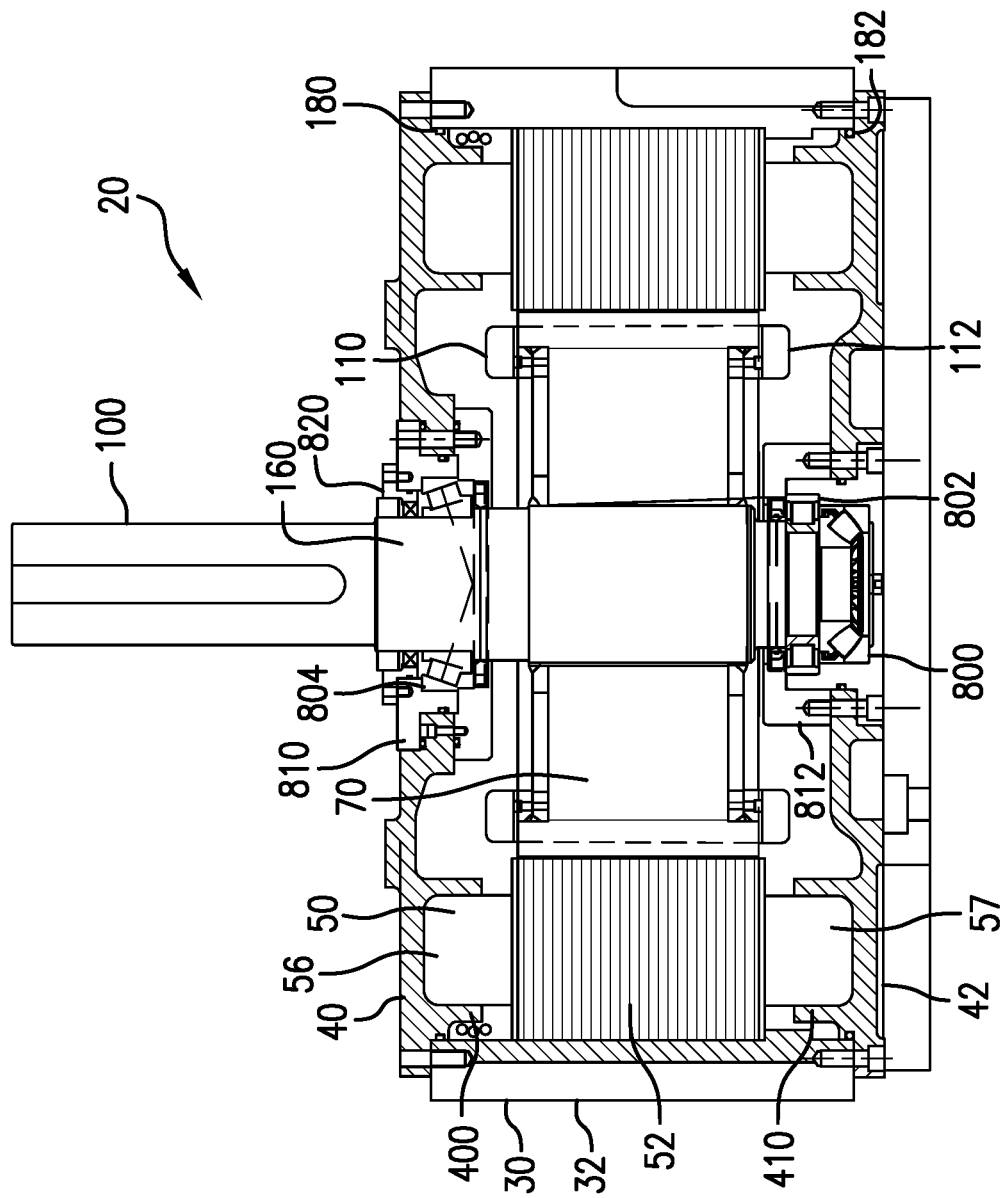
FIG. 9A is a side view, partially in cross-section, of the motor of FIG. 1, the view showing the end turns of the coils are partially encapsulated by the motor casing covers in accordance with one embodiment of the invention.
Figure 9B:
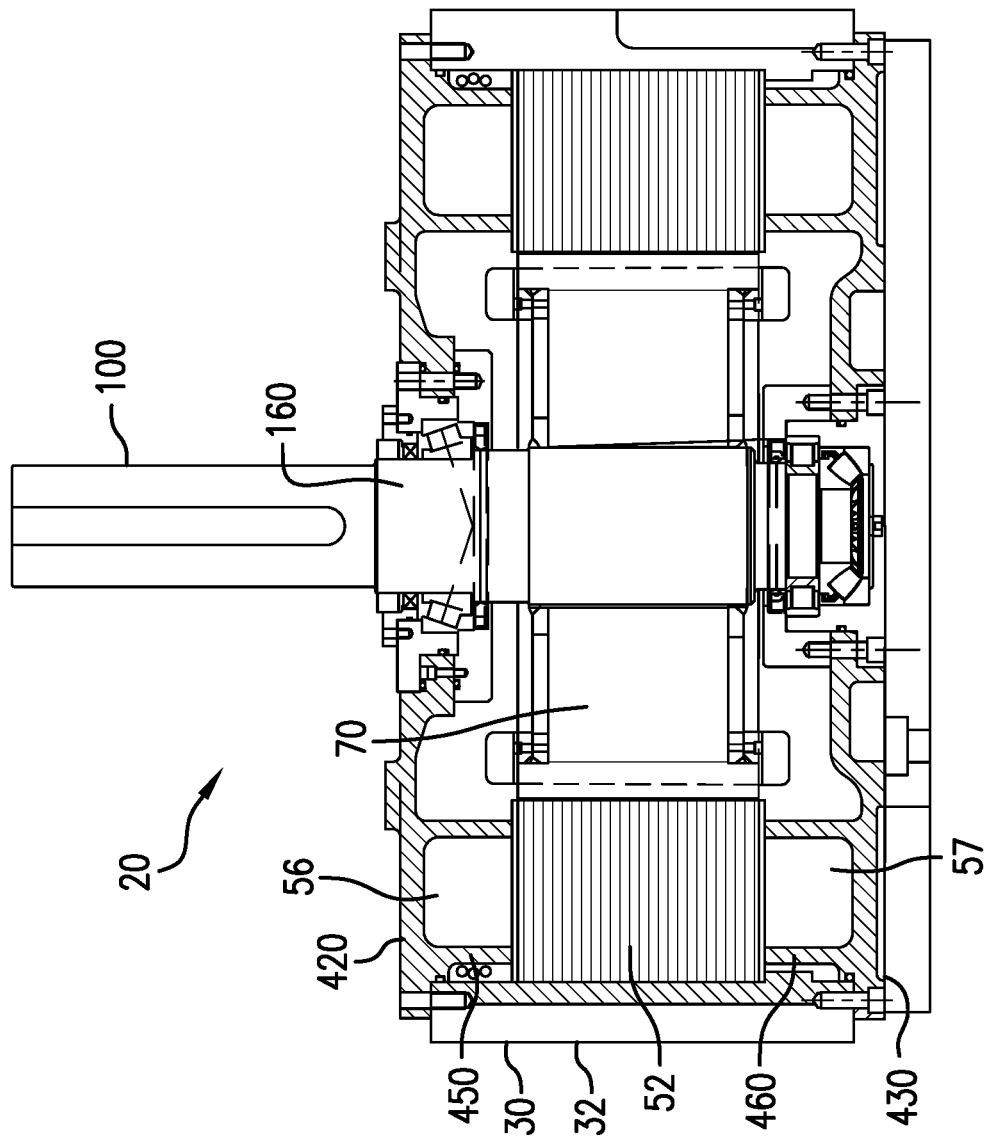
FIG. 9B is a side view, partially in cross-section, of the motor of FIG. 1, the view showing the end turns of the coils completely encapsulated by the motor casing covers in accordance with another embodiment of the invention.

Referring to FIG. 9A, in one embodiment, cover 40 is configured with inner portion 400 that partially encapsulates end turns 56 of windings 54 when cover 40 is attached to casing 30. Such an embodiment allows heat to be transferred from end turns 56 to cover 40. Similarly, cover 42 is configured with inner portion 410 that partially encapsulates end turns 57 of windings 54 when cover 42 is attached to casing 30. In an alternate embodiment, shown in FIG. 9B, alternate covers 420 and 430 are used in place of covers 40 and 42, respectively, which improve the heat transfer from end turns 56 and 57. Cover 420 is configured with inner portion 450 that is sized and shaped to completely encapsulate end turns 56 when cover 420 is attached to casing 30. Similarly, cover 430 is configured with inner portion 460 that is sized and shaped to completely encapsulate end turns 57 of windings 54 when cover 430 is attached to casing 30. In both embodiments shown FIGS. 9A and 9B, end turns 56 and 57 are in direct contact with covers 420 and 430, respectively, thereby minimizing the distance the heat needs to flow and maximizing the transfer of heat to covers 420 and 430 and away from magnets 82. Thus, covers 40, 42 and covers 420 and 430 function as heat sinks. Covers 40, 42 and 420, 430 are also in direct contact with the cooling tower airstream which further increases the amount of heat transferred from covers 40, 42 or 420, 430.

In another embodiment, windings 54 undergo a Vacuum Pressure Impregnation (VPI) process that uses pressure to infuse windings 54 with epoxy to provide electrical insulation and protection from contamination. In another embodiment, a thermally conductive potting is used in conjunction with the VPI process. The thermally conductive potting material may also be an electrical insulator. Such a configuration fills any air gaps in the VPI-processed end turns of the windings so as to improve heat transfer between end turns of the windings and covers 40 and 42, or covers 500 and 502. In yet a further embodiment, the VPI process is applied to the entire winding except the end turns. The end turns are then potted with a thermally conductive material such as STYCAST 2850 FT, which is a thermally-conductive epoxy which also functions as an electrical insulator.

As an alternative to processing windings 54 and end turns with VPI epoxy, windings 54 and the end turns can be infused with Silicone resin SILRES®H62 C which has a thermal conductivity of 0.2 (W/m K).

It is to be understood that the height, width and configuration of the end turns 56 and 57 can be formulated so as to match the form of the interior of covers 40 and 42 or covers 420 and 430.

In a preferred embodiment, windings 54 are formed with a relatively smaller gauge wire in order to enhance dissipation of motor heat into the external environment surrounding motor 20. It has been found that forming windings 54 with a relatively smaller gauge wire allows formations of relatively shorter end turns which, in turn, reduce the height of and heat generated by end turns 56 and 57 of windings 54. The reduced height of end turns 56 and 57 allow the height of motor 20 to be reduced so that fan 26 can be positioned at the correct height within fan stack 22 (see FIG. 1). It has also been found that tightly packing windings 54 and locating heat producing windings 54 in deep slot laminations 51 and using silicone epoxy resin 53 between the laminations 51 to develop a thermal block and inserting stator assembly 52 into casing 30 with a thermal conductive potting in gap 300 significantly enhances conductive heat transfer to casing 30, which is a heat sink, and dissipation of motor heat from cooling fins 340 to the surrounding airstream developed by the direct drive fan.

Vacuum pressure impregnation (VPI) is typically used to infuse a motor coil or winding with epoxy to provide electrical insulation and protects from contamination. The electrical insulation is necessary because the coils must be electrically insulated from the laminations. VPI is typically used with motors that are not sealed from the environment and are susceptible to contamination. However, it has been found that since motor 20 is a sealed motor and is not susceptible to contamination, windings 54 do not have to VPI-processed to prevent contamination of the windings 54. Furthermore, in the embodiment of FIG. 13, Pall Filter 700 is used with motor 20 so that motor 20 is sealed with filtered air. Such an embodiment totally dispenses with the need to VPI-process windings 54 to prevent contamination. In motor 20, windings 54 are only treated with materials that electrically insulate windings 54 from laminations 51 and enhance dissipation of heat in windings 54 and end turns 56 and 57 through casing 30 and covers 40 and 42.

Figure 10:
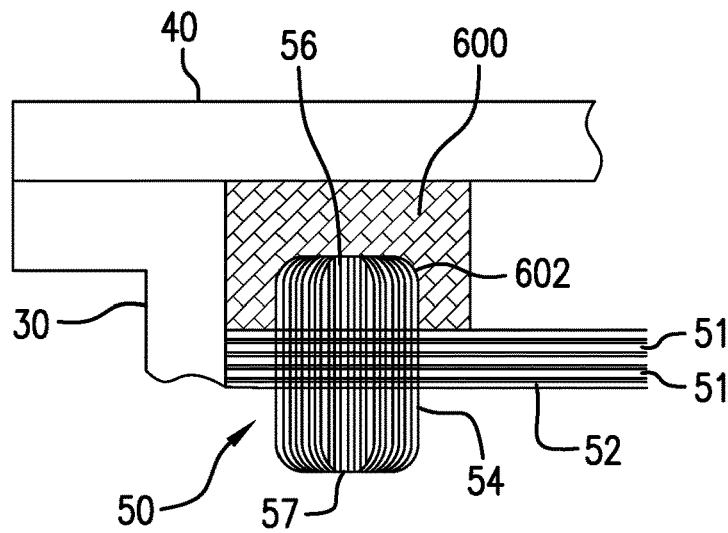
FIG. 10 is a diagram illustrating a chill block used within the motor to facilitate dissipation of heat in the winding end turns in accordance with one embodiment of the present invention.

Referring to FIG. 10, there is shown another embodiment that enhances heat transfer from end turns 56 and 57 to casing 30 and covers 40 and 42. This embodiment can be used if windings 54 were previously subject to a VPI process. Circumferentially extending chill block 600 is integrally formed with cover 40. Chill block 600 has channel 602 formed therein. Similarly, another chill block (not shown) is integrally formed with cover 42 for drawing heat from end turns 57. For purposes of brevity, only cover 40 and chill block 600 are described herein. Chill block 600 is formed in cover 40 and configured so that it encapsulates end turns 56 when cover 40 is bolted to casing 30. Such a configuration effects significant transfer of heat from windings 54 and end turns 56 to chill block 600. In this embodiment, windings 54 are formed so that end turns 56 have a size and shape that conforms to geometry of channel 602 in chill block 600 so as to maximize the amount of surface area of end turns 56 that physically contact chill block 600. Such a configuration maximizes the transfer of heat from the end turns 56 to cover 40. As cover 40 is being connected to casing 30, end turns 56 slip into the corresponding channel 602 of chill block 600 wherein end turns 56 physical contact chill block 600. Thermal grease may be used to facilitate placement of end turns 56 into channel 602.

In an alternate embodiment, the chill blocks are separate components and are attached to covers 40 and 42 with fastener devices such as screws, bolts, etc. In such an embodiment, the chill blocks can be adjusted to accommodate the formed height of the end turns 56 and 57 without upsetting the thermal heat path. This can be accomplished by using full profile shims, attached with the same fastener devices, between the chill blocks and covers 40 and 42 to accommodate the height of the end turns 56 and 57. This embodiment also allows the use of Aluminum chill blocks inside of motor 20 and casing 30 made from cast iron.

Figure 11:
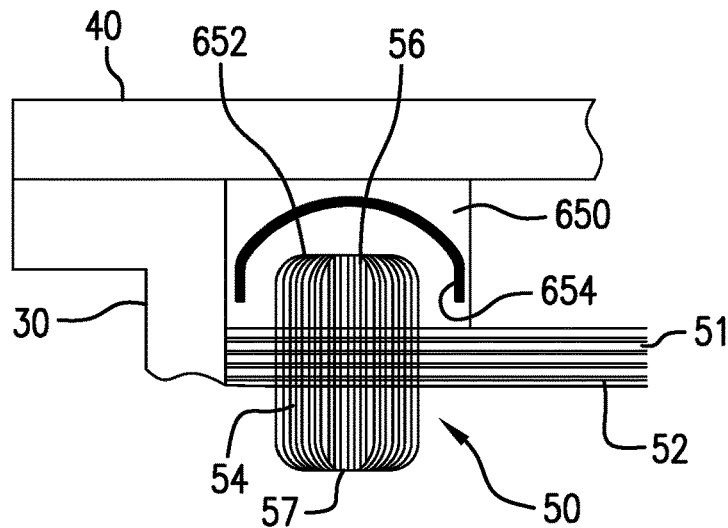
FIG. 11 is a diagram illustrating a chill block used within the motor to facilitate dissipation of heat in the winding end turns in accordance with another embodiment of the present invention.

Referring to FIG. 11, there is shown another embodiment of the invention wherein chill block 650 is configured with channel 652 which provides the same function as channel 602 in FIG. 10. Chill block 650 also includes internal cooling passage 654 for receiving a cooling gas and/or cooling fluids or cooling solids (e.g. phase change heat sink with sodium filled valves). Internal cooling passage 654 may be configured to have any shape or geometry. Gases and liquids may be pumped using inlet and outlet taps through the covers 40 and 42 or from other inlet and outlet sources.

In an alternate embodiment, pressurized water from the cooling tower is circulated in the chill block to heat and cool the motor, avoiding the cost and weight of a pumping system. In a preferred embodiment, the cooling tower water is used with a heat exchanger so that the closed loop fluid circulated in the chill block can be mixed with an anti-freeze as required for cold service. In a further embodiment, the pressurized hot water returned from the process can be combined with the pressurized return of cooler water from the basin feed to the process to provide a suitable temperature via mixing valves and thermostats. A third make-up water source can be used as required to provide a suitable temperature to the motor (hot or cold) to maintain optimum motor efficiency through various environmental conditions and process loads similar to an automobile radiator and thermostat.

In an alternate embodiment, heat conductive potting is disposed between the VPI-processed end turns 56 and chill blocks 600 or 650 to fill any gaps and/or voids after VPI processing. This embodiment enhances conductive heat transfer between the end turns 56 and chill block 600 or 650. The heat conductive potting may be applied before or VPI processing. The aforementioned Thermade™ Conductive Gap Filler, epoxy or silicone resin, or thermal grease may be used in this embodiment. This embodiment also applies to end turns 57 and the corresponding chill block.

In an alternate embodiment, the VPI epoxy and/or insulation is removed from the end turns of the windings to expose the copper. In this embodiment, the copper of the end turns directly contacts the chill block. The chill block is fabricated from a material that acts as a good electrical insulator as well as a good conductor of heat. Suitable materials for fabricating the chill blocks include Aluminum, Silicone, Graphite (CSX Refractory Graphite), alumina Ceramic (CoorTek AD96), CoorTek Ceramic alumina oxide, CoorTek Structural Ziconia Ceramics or other material that is a good conductor of heat and a good electrical insulator. As an alternative, the VPI epoxy insulation is removed from the end turns and the exposed copper directly contacts the chill block.

In one embodiment, an Aluminum chill block is used and the chill block is treated with Ceramic Barrier Spray.

In an alternate embodiment, the VPI epoxy and/or insulation is removed from the end turns of the coil to expose the copper. Next, an electrical insulator, such as shielding, wrap or potting that is a good conductor of heat and good electrical insulator, is applied between the exposed copper of the end turns and an Aluminum chill block. A suitable electrical insulator includes Polymer Science PS-1510, Thermade™ Conductive Gap Filler and silicone-based epoxies and resins. In an alternate embodiment, an electrically insulating coil wrap is applied to the exposed copper of the end turns. One suitable coil wrap is the Arlon SFT Self Fusing Tape. This self-fusing directly contacts the aluminum chill block. In another embodiment, CHO-Therm Pads are affixed or adhered to the inside of the chill block. In another embodiment, HITHERM C3200 Interface materials are used between the exposed copper of the end turns and the aluminum chill block. In a further embodiment, CoorTEK Alumina Ceramic is bonded to the aluminum chill block to insulate the exposed copper of the end turns. In a further embodiment, the aluminum chill block is lined with Li-2000 Heat Sink Tape that provides electrical insulation and good thermal conductivity to the bare winding or coil.

Figure 12:
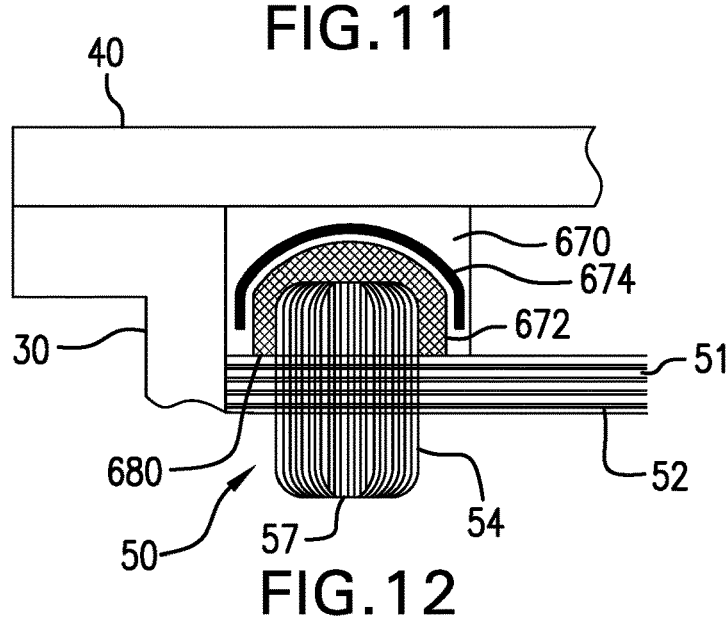
FIG. 12 is a diagram illustrating a chill block used within the motor to facilitate dissipation of heat in the winding end turns in accordance with a further embodiment of the present invention.

Referring to FIG. 12, there is shown an alternate embodiment of the invention. In this embodiment, the chill block 670 is made from Aluminum or another metal having equivalent thermal and electrical conduction properties. Chill block 670 includes channel 672 and internal cooling passage 674. Internal cooling passage 674 performs the same function as internal cooling passage 654. Cap 680, which functions as a thermal conductor and an electrical insulator, is fitted to end turns 56 and positioned within channel 672. Cap 680 is in direct contact with chill block 670 for maximum transfer of heat. Cap 680 is fabricated from a material that is a good conductor of heat and a good electrical insulator. Suitable material that can be used to form cap 680 includes Graphite, Silicone or equivalent material. A chill block having the same structure and properties is also used to draw heat from end turns 57.

In an alternate embodiment, the chill block is coated with an Alumina-based ceramic barrier coating, or equivalent, that is a good conductor of heat and a good electrical insulator. In this embodiment, the copper of the end turns 56 is exposed and in direct contact with the ceramic barrier coating applied to the chill block.

In an alternate embodiment, a shrink fit is formed between cover 40 and casing 30 to allow for maximum interface and surface area contact. Suitable materials for shrink fitting include Aluminum or any material that is a good conductor of heat. In another embodiment, the material for shrink fitting is a material that is a good conductor of heat and a good electrical insulator so that the end coil could be encapsulated by chill block 600 without VPI epoxy or insulation.

In an alternate embodiment, an Alumina Ceramic Coating (CoorsTek or equivalent) is vacuum bonded or Vacuum Pressure Impregnated to windings 54 to provide required electrical insulation and improve thermal conductivity.

It is to be understood that a combination of any of the embodiments of FIGS. 10, 11 and 12 and alternate embodiments thereof may be used in motor 20.

In another embodiment, chill blocks are used throughout motor 20 to remove heat.

Figure 13:
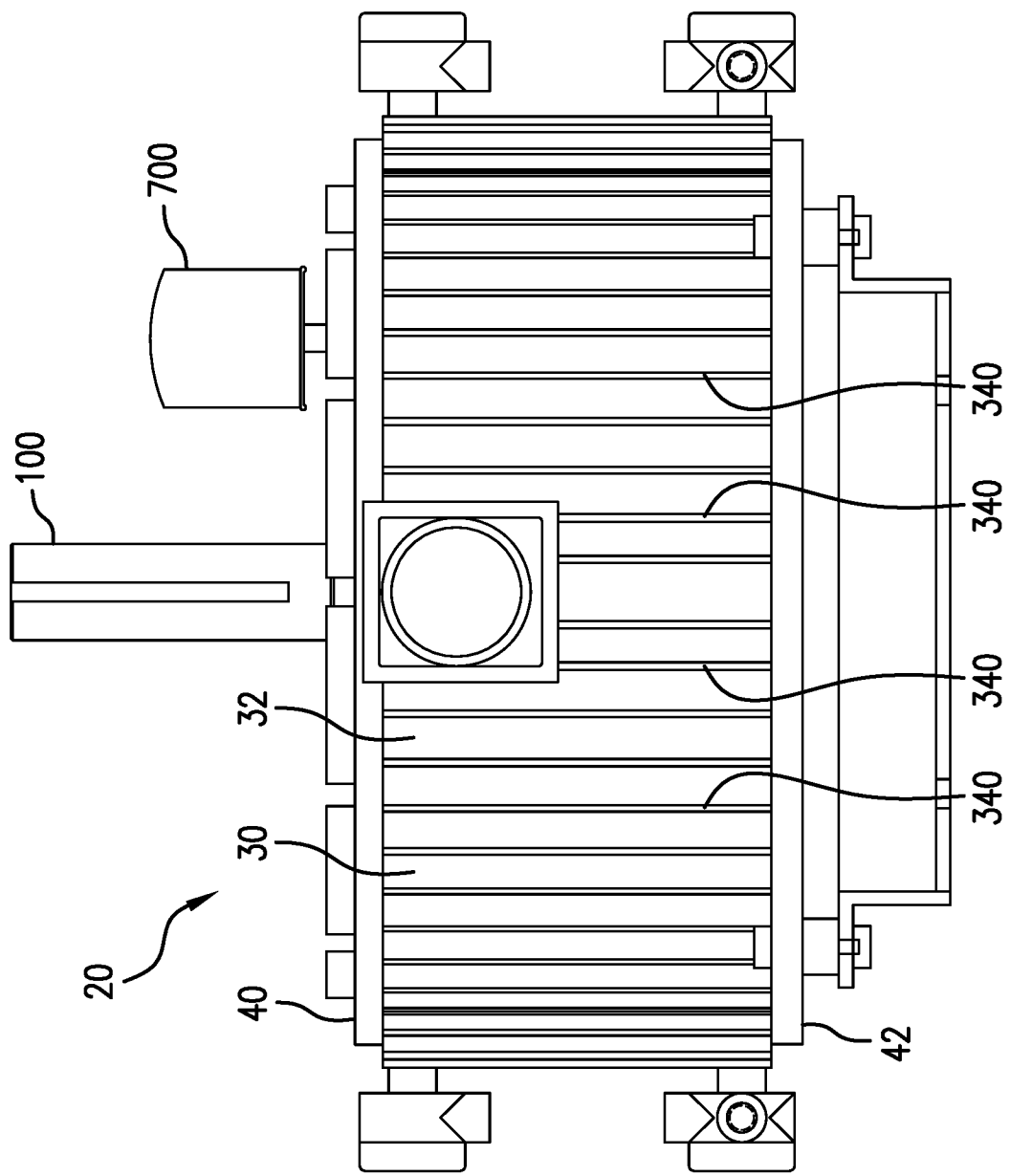
FIG. 13 is a side elevational view of a motor in accordance with another embodiment of the present invention.

Motor thermal expansion and condensation management is vital to maintaining motor sealing integrity, preventing contamination and moisture from entering the motor and maintaining proper internal motor pressure and temperatures. Referring to FIG. 13, in one embodiment, motor 20 comprises a Pall PFD Reservoir Vent Filter 700 to manage volume changes in motor 20 and has a 1 μm solid particulate removal rating and filter system with an isolation valve system. In this embodiment, Pall Filter 700 is used in combination with an internal motor temperature sensor located within motor 20. In such an embodiment, when the environmental temperature falls below a predetermined threshold, the internal motor temperature sensor outputs a signal that is inputted into the Variable Frequency Drive (VFD) device and control system. In response, the control system outputs a signal to the VFD which, in response, outputs a signal that energizes the windings 54 in order to create heat within motor 20. In an alternate embodiment, external temperature sensors on exterior surface 32 of casing 30 are used to output signals when the temperature falls below the predetermined threshold. In an alternate embodiment, a feedback loop is used with motor 20 wherein the feedback loop comprises humidity sensors, such as a humidistat, a variable temperature control (programmable controller), VFD, and internal and/or external temperature sensors to control motor internal condensation and temperature. In such an embodiment, data from an on-site or off-site weather station can be inputted into the programmable controller. These aforementioned embodiments can be used instead of a trickle heater so as to allow the motor interior to be automatically heated to prevent condensation.

In an alternate embodiment, the windings or coils can be heated by programming the motor to operate less efficiently on cold days and at a relatively slow speed so as to produce more heat within the motor. For example, the VFD can add more amps to the motor (e.g. coils), which is controlled independently of the motor speed. This allows the control system to provide heat to the motor and prevent freezing during the winter by operating the motor at slow speeds while maintaining motor thermal expansion, contraction and volume which are vital to the motor sealing system. In an alternate embodiment, a control system is used which comprises internal and external motor temperature sensors, an independent internal motor pressure sensor, an independent internal motor humidity sensor, and electronic circuitry for receiving signals representing weather station data, process demand and motor speed.

Referring to FIG. 9A, in one embodiment, motor 20 includes a bearing system that comprises spherical roller thrust bearing 800, a cylindrical roller bearing 802 and tapered roller output bearing 804. Spherical roller thrust bearing 800 absorbs the thrust load caused by the weight of fan 26 and fan thrust forces due to airflow. Cylindrical roller bearing 802 is located immediately above spherical roller thrust bearing 800 and opposes radial loads at the thrust end of shaft 100. Tapered roller output bearing 804 is configured to have a high radial load capability coupled with thrust capability to oppose the relatively low reverse thrust loads that occur during de-icing (reverse rotation) or high wind gust. Bearing housing 810 houses bearing 804. Bearing housing 812 houses bearings 800 and 802. Bearing housings 810 and 812 are isolated from the interior of casing 30 by nitrile rubber, double lip-style radial seals. Seal housing 820 houses sealing device 160.

The motor embodiments described herein may be used with or controlled by the control systems disclosed in the aforementioned international application no. PCT/US2012/061244 entitled "Direct Drive Fan System With Variable Process Control".

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated

What is claimed is:

1. A sealed, passively cooled motor, comprising:
a casing having an interior space, an interior wall extending about the interior space, a first end and an opposite second end;
a stator assembly disposed within the casing and potted to the interior wall, wherein the stator assembly further comprises a plurality of deep slotted laminations disposed radially between the interior wall and a rotor having a plurality of magnets disposed within the interior space of the casing and windings inserted through and embedded by in the plurality of deep slotted laminations adjacent to the interior wall and spaced from the rotor, the windings having a first plurality of end turns at a first end of the stator assembly and a second plurality of end turns at an opposite second end of the stator assembly,
a first resin disposed over portions of the laminations that are covered by the windings and adjacent to the interior wall of the casing so as to provide a thermal block and enhance heat transfer from the windings to the casing, and a second resin disposed over portions of the laminations between the portions of the laminations covered by the first resin and the rotor that impedes heat transfer towards the magnets;
a first cover attached to the first end of the casing, wherein the first cover has an interior portion that is configured to encapsulate and directly contact the first plurality of end turns to provide a conductive heat transfer path adapted to effect transfer of heat from the first plurality of end turns to the first cover, wherein the first cover provides a heat sink for the first plurality of end turns;
a first continuous O-ring seal positioned between the first cover and the casing to seal the first cover to the casing;
a second cover attached to the opposite second end of the casing, wherein the second cover has an interior portion that is configured to encapsulate and directly contact the second plurality of end turns to provide a conductive heat transfer path adapted to effect transfer of heat from the second plurality of end turns to the second cover, wherein the second cover provides a heat sink relative to the second plurality of end turns; and a second continuous O-ring seal 182 positioned between the second cover and the casing to seal the second cover to the casing.

2. The sealed, passively cooled motor according to claim 1, wherein the rotor defines a centerline of the sealed, self-cooling motor and wherein the first cover and the second cover each have an exterior surface that is configured with a plurality of cooling fins that radially extend with respect to the centerline.

3. The sealed, passively cooled motor according to claim 1, wherein the rotor defines a centerline of the sealed, self-cooling motor and wherein the casing comprises an exterior surface that is configured with a plurality of cooling fins that extend parallel with respect to the centerline.

4. The sealed, passively cooled motor according to claim 1 wherein the plurality of deep slotted laminations are stacked together to form a stator stack, the sealed, passively cooled motor further comprising a thermally conductive material disposed between the first plurality of end turns and the interior wall and between the second plurality of end turns and the interior wall so as to create a heat dissipation path from the end turns and through the stator stack and to the casing exterior, wherein the thermally conductive material further comprises one or more of the materials selected from the group of materials comprising: a bonding material between the stator lamination sheets; an electrically insulative and thermally conductive potting; and a vacuum pressure impregnation of the windings.

5. The sealed, passively cooled motor according to claim 1 wherein the plurality of deep slotted laminations are stacked together to form a stator stack, the sealed, self-cooling motor further comprises an electrically insulative and thermally conductive potting material between the interior wall of the casing and the lamination sheets.

6. The sealed, passively cooled motor according to claim 1, further comprising a two-way vent filter apparatus mounted to the casing to manage air volume changes that may be caused by temperature and/or pressure changes within the interior space of the casing, wherein the two-way vent filter apparatus filters the incoming air of moisture and particulates so as to maintain the dryness and cleanliness within the interior space of the casing.

7. The sealed, passively cooled motor according to claim 6 wherein the two-way vent filter apparatus comprises a Pall PFD Reservoir Vent Filter.

8. The sealed, passively cooled motor according to claim 1 wherein the first cover comprises an integral chill block.

9. The sealed, passively cooled motor according to claim 8 wherein the chill block comprises at least one internal cooling passage.

10. The sealed, passively cooled motor according to claim 1 wherein a chill block is attached to the first cover.

11. The sealed, passively cooled motor according to claim 1, wherein the rotor comprises:
a hollow cylindrical member having a rotor interior region, a rotor interior wall extending about the rotor interior region, and a rotor exterior surface,
a rotor shaft support structure disposed within the rotor interior region,
a rotor shaft attached to the rotor shaft support structure,
bearings adapted to locate and support the rotor shaft relative to the housing, and
the plurality of magnets disposed on the rotor exterior surface of the hollow cylindrical member.

* * * * *